(12) United States Patent
Suzuki

(10) Patent No.: US 7,603,337 B2
(45) Date of Patent: Oct. 13, 2009

(54) STORAGE SYSTEM OPERATION MANAGEMENT METHOD AND STORAGE SYSTEM

(75) Inventor: Tomohiko Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/604,197

(22) Filed: Nov. 27, 2006

(65) Prior Publication Data

US 2008/0091638 A1 Apr. 17, 2008

(30) Foreign Application Priority Data

Oct. 17, 2006 (JP) ............................. 2006-282503

(51) Int. Cl.
*G06F 17/30* (2006.01)
(52) U.S. Cl. ............................. 707/1; 711/100; 711/114
(58) Field of Classification Search ...................... 707/1; 711/114, 6, 7, 100
See application file for complete search history.

(56) References Cited

U.S. PATENT DOCUMENTS

| | | | | |
|---|---|---|---|---|
| 5,666,512 A | * | 9/1997 | Nelson et al. ............... | 711/114 |
| 6,269,382 B1 | * | 7/2001 | Cabrera et al. .............. | 707/204 |
| 6,275,898 B1 | * | 8/2001 | DeKoning ................... | 711/114 |
| 6,973,534 B2 | * | 12/2005 | Dawson et al. .............. | 711/112 |
| 7,096,338 B2 | | 8/2006 | Takahashi et al. | |
| 7,133,988 B2 | * | 11/2006 | Fujibayashi ................. | 711/162 |
| 7,136,883 B2 | * | 11/2006 | Flamma et al. ............. | 707/204 |

FOREIGN PATENT DOCUMENTS

JP 2006-099748 8/2005

* cited by examiner

*Primary Examiner*—Etienne P LeRoux
*Assistant Examiner*—Thuy (Tiffany) Bui
(74) *Attorney, Agent, or Firm*—Stites & Harbison PLLC; Juan Carlos A. Marquez, Esq.

(57) ABSTRACT

Files belonging to a file group are collected at an uppermost tier when a specific action occurs with respect to a key file of the file group. When an action with respect to a keyword occurs while a management processor of a disc adapter is taken as a management server and a host is taken as an agent, and file promotion processing is carried out by the management server by starting management software in accordance with a microprogram. When the content of the specific action satisfies promotion conditions, the other files belonging to the same file group as the key file are promoted to the uppermost tier to be ready for utilization.

12 Claims, 13 Drawing Sheets

| FILE GROUP NAME | WEIGHTING | FILE NAME | KEY FILE | LOCATED Tier | CAPACITY | FILE DEMOTION CONDITIONS |
|---|---|---|---|---|---|---|
| Group_A | 5 | A_File_01 | True | Tier1 | CAPACITY A-1 MB | FILE DEMOTION CONDITIONS A0 |
|  |  | A_File_02 | True | Tier1 | CAPACITY A-2 MB |  |
|  |  | A_File_03 | False | Tier2 | CAPACITY A-3 MB |  |
|  |  | A_File_04 | False | Tier3 | CAPACITY A-4 MB |  |
| Group_B | 2 | B_File_01 | True | Tier1 | CAPACITY B-1 MB | FILE DEMOTION CONDITIONS B0 |
|  |  | B_File_02 | False | Tier3 | CAPACITY B-2 MB |  |
|  |  | B_File_03 | False | Tier3 | CAPACITY B-3 MB |  |

| FILE GROUP NAME | KEY FILE CONDITIONS | PROMOTION CONDITIONS | DEMOTION CONDITIONS | KEY FILE NAME |
|---|---|---|---|---|
| Group_A | KEY FILE CONDITIONS A1 | PROMOTION CONDITIONS A1 | - | A_File_01 |
|  | KEY FILE CONDITIONS A2 | - | DEMOTION CONDITIONS A2 | A_File_02 |
| Group_B | KEY FILE CONDITIONS B1 | PROMOTION CONDITIONS B1 | DEMOTION CONDITIONS B1 | B_File_01 |

| Tier NAME | TOTAL Tier CAPACITY | USED Tier CAPACITY |
|---|---|---|
| Tier1 | CAPACITY 1 | USED CAPACITY 1 |
| Tier2 | CAPACITY 2 | USED CAPACITY 2 |
| Tier3 | CAPACITY 3 | USED CAPACITY 3 |

| FILE GROUP NAME | FILE NAME | KEY FILE | LOCATED Tier | FILE DEMOTION CONDITIONS |
|---|---|---|---|---|
| Group_A | A_File_01 | True | Tier1 | FILE DEMOTION CONDITIONS A0 |
|  | A_File_02 | True | Tier1 |  |
|  | A_File_03 | False | Tier2 |  |
|  | A_File_04 | False | Tier3 |  |
| Group_B | B_File_01 | True | Tier1 | FILE DEMOTION CONDITIONS B0 |
|  | B_File_02 | False | Tier3 |  |
|  | B_File_03 | False | Tier3 |  |

FIG.9A            FIG.9B
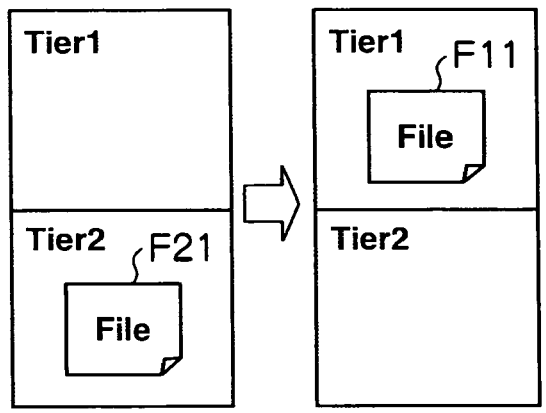
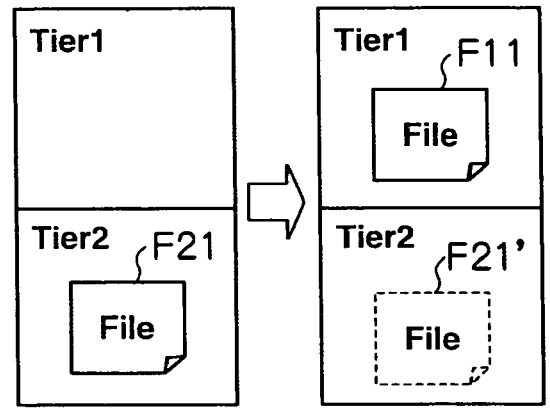

| FILE GROUP NAME | WEIGHTING | FILE NAME | KEY FILE | LOCATED Tier | CAPACITY | FILE DEMOTION CONDITIONS |
|---|---|---|---|---|---|---|
| PATIENT A INFORMATION | 5 | RECEPTION LEDGER A | True | Tier1 | 1 MB | WEIGHTING COEFFICIENT : WEIGHTING & CAPACITY TIME : NO. OF DAYS FROM DAY OF FINAL UPDATE THRESHOLD VALUE : x |
| | | CLINICAL CHART A1 | False | Tier2 | 2 MB | |
| | | CLINICAL CHART A2 | False | Tier2 | 2 MB | |
| | | CLINICAL CHART A3 | False | Tier2 | 3 MB | |
| | | EXAMINATION RECORD A | False | Tier2 | 5 MB | |
| | | ADMISSION RECORD A | False | Tier2 | 10 MB | |
| | | RECORD OF ACCOUNTS A | False | Tier1 | 2 MB | |
| PATIENT B INFORMATION | 3 | RECEPTION LEDGER B | True | Tier1 | 1 MB | WEIGHTING COEFFICIENT : WEIGHTING & CAPACITY TIME : NO. OF DAYS FROM DAY OF FINAL UPDATE THRESHOLD VALUE : x |
| | | CLINICAL CHART B1 | False | Tier1 | 2 MB | |
| | | CLINICAL CHART B2 | False | Tier1 | 2 MB | |
| | | RECORD OF ACCOUNTS B | False | Tier1 | 1 MB | |

| FILE GROUP NAME | KEY FILE CONDITIONS | PROMOTION CONDITIONS | DEMOTION CONDITIONS | KEY FILE NAME |
|---|---|---|---|---|
| PATIENT A INFORMATION | ·MOST RECENT UPDATE DAY<br>·FILE NAME : INCLUDES "RECEPTION LEDGER" | UPDATE | - | RECEPTION LEDGER A |
| PATIENT B INFORMATION | ·MOST RECENT UPDATE DAY<br>·FILE NAME : INCLUDES "RECEPTION LEDGER" | UPDATE | - | RECEPTION LEDGER B |

| Tier NAME | TOTAL Tier CAPACITY | USED Tier CAPACITY |
|---|---|---|
| Tier1 | 50 GB | 49 GB |
| Tier2 | 500 GB | 100 GB |

| FILE GROUP NAME | FILE NAME | KEY FILE | LOCATED Tier | FILE DEMOTION CONDITIONS |
|---|---|---|---|---|
| PATIENT A INFORMATION | RECEPTION LEDGER A | True | Tier1 | WEIGHTING COEFFICIENT : WEIGHTING & CAPACITY TIME : NO. OF DAYS FROM DAY OF FINAL UPDATE THRESHOLD VALUE : x |
| | CLINICAL CHART A1 | False | Tier2 | |
| | CLINICAL CHART A2 | False | Tier2 | |
| | CLINICAL CHART A3 | False | Tier2 | |
| | EXAMINATION RECORD A | False | Tier2 | |
| | ADMISSION RECORD A | False | Tier2 | |
| | RECORD OF ACCOUNTS A | False | Tier1 | |
| PATIENT B INFORMATION | RECEPTION LEDGER B | True | Tier1 | WEIGHTING COEFFICIENT : WEIGHTING & CAPACITY TIME : NO. OF DAYS FROM DAY OF FINAL UPDATE THRESHOLD VALUE : x |
| | CLINICAL CHART B1 | False | Tier1 | |
| | CLINICAL CHART B2 | False | Tier1 | |
| | RECORD OF ACCOUNTS B | False | Tier1 | |

STORAGE SYSTEM OPERATION MANAGEMENT METHOD AND STORAGE SYSTEM

CROSS-REFERENCE TO RELATED APPLICATIONS

This application relates to and claims priority from Japanese Patent Application No. 2006-282503, filed on Oct. 17, 2006, the entire disclosure of which is incorporated herein by reference.

BACKGROUND

1. Field of the Invention

The present invention relates to technology for arranging storage regions of storage logically into tiers, distributing file groups through relocation into each tier, and managing the relocation of files belonging to each group into collections of files belonging to any tier as file groups.

2. Description of Related Art

A storage system is equipped, for example, with at least one storage apparatus referred to as a disc array sub-system, etc. In this type of storage apparatus, disc drives such as, for example, hard disc drives or semiconductor memory drives etc. are relocated in an array so as to enable storage regions to be provided based on RAID (Redundant Array of Independent Inexpensive Disks). A host computer then accesses logical storage regions supplied by the storage apparatus and carries out reading and writing of data.

In the related art, a storage system provided with a plurality of storage apparatus having one or more volumes, a virtualizing section for collectively managing volumes in the possession of each storage apparatus in a virtual manner, a storage section for storing volume attribute information for managing attribute information of each volume, and a relocation section for relocating a specified transfer source volume to a specified storage tier between a plurality of storage tiers generated based on a plurality of policies set in advance and volume attribute information is proposed (refer to patent document 1).

[Patent Document 1]

Japanese Patent Laid-open Publication No. 2006-99748.

With storage environments that are structured in tiers of storage systems of the related art, it is necessary to relocate files to each storage tier in an optimal manner taking into consideration utilization frequency and importance of the data.

Namely, storage systems of the related art adopt a configuration taking access frequency of file group units where a file or plurality of files are collected together as a reference, and relocate files to any one of the tiers every unit. This is therefore not sufficient for relocating files to file groups in an optimum manner.

Specifically, the file group is utilized at irregular intervals, and utilization every one time is for a comparatively short time. However, a state is adopted in the storage system where files within the group are used overall, and if the deciding of the file used first in a one time utilization of the file group is not taken into consideration, the following problem occurs.

For example, in order to promote files belonging to a file group to the uppermost tier, an access of a certain extent is necessary, and a time lag occurs until use at the uppermost tier is possible. Because of this, when a file of the file group is promoted to the uppermost tier, it is common for the operation using this file group to have advanced to a certain extent. However, when the access frequency falls, it is possible for files belonging to this file group to be demoted to a lower tier. Further, it is also possible for the group as a whole to be relocated through interchange at the uppermost tier or a lower tier. There are therefore cases where a comparatively large reduction or increase in capacity occurs with regards to the storage region between the transfer source and transfer destination at the time of file transfer.

It is therefore the object of the present invention to collect files belonging to a file group at the uppermost tier when a specific action occurs with regards to a file group. Moreover, it is a further object of the present invention to always maintain optimum file promotion conditions or file demotion conditions with regards to the file group by dynamically changing the files subject to observation (key files) within the file group.

SUMMARY

In order to resolve the aforementioned problems, the present invention sets files belonging to the uppermost tier of files belonging to a file group as files subject to observation (key files) so that when a specific action occurs with regards to the files subject to observation, files belonging to the same file group as the files subject to observation are promoted to the uppermost tier as files having mutual correlation when the promotion conditions are satisfied. On the other hand, demotion to a lower tier than the uppermost tier is also possible when files of the files of the uppermost tier that satisfy demotion conditions exist.

It is therefore possible to relocate files of a file group containing a file subject to observation to the uppermost tier from the start of utilization by setting files used first of the files belonging to a file group as files subject to observation (key files), and promoting files of the same file group as the file subject to observation to the uppermost tier in response to an action with respect to the file subject to observation. On the other hand, when demotion conditions are satisfied for a file belonging to the uppermost tier, this file is demoted, and it is therefore possible to prevent files from being demoted at an unintended time. It is therefore possible to dynamically change the file subject to observation by designating conditions for files subject to observation (key files), and it is possible to always keep promotion or demotion conditions for the file group optimized.

Effects of the Invention

According to the present invention, it is possible to relocate all of the files of a file group containing a file subject to observation in the uppermost tier from the start of utilization.

Other aspects and advantages of the invention will be apparent from the following description and the appended claims.

BRIEF DESCRIPTION OF THE DRAWINGS

FIG. 4A is a view illustrating a configuration for a file group management table, FIG. 4B is a key file management table, FIG. 4C is a tier management table;

FIG. 4D is a file group management table;

FIG. 9A and FIG. 9B each shows a view illustrating a promotion pattern for a file;

FIG. 12A is a view illustrating a configuration for a file group management table;

FIG. 12B is a key file management table;

FIG. 12C is a tier management table used in a patient management system;

FIG. 12D is a file group management table; and

DETAILED DESCRIPTION OF PREFERRED EMBODIMENTS

Figure 1:
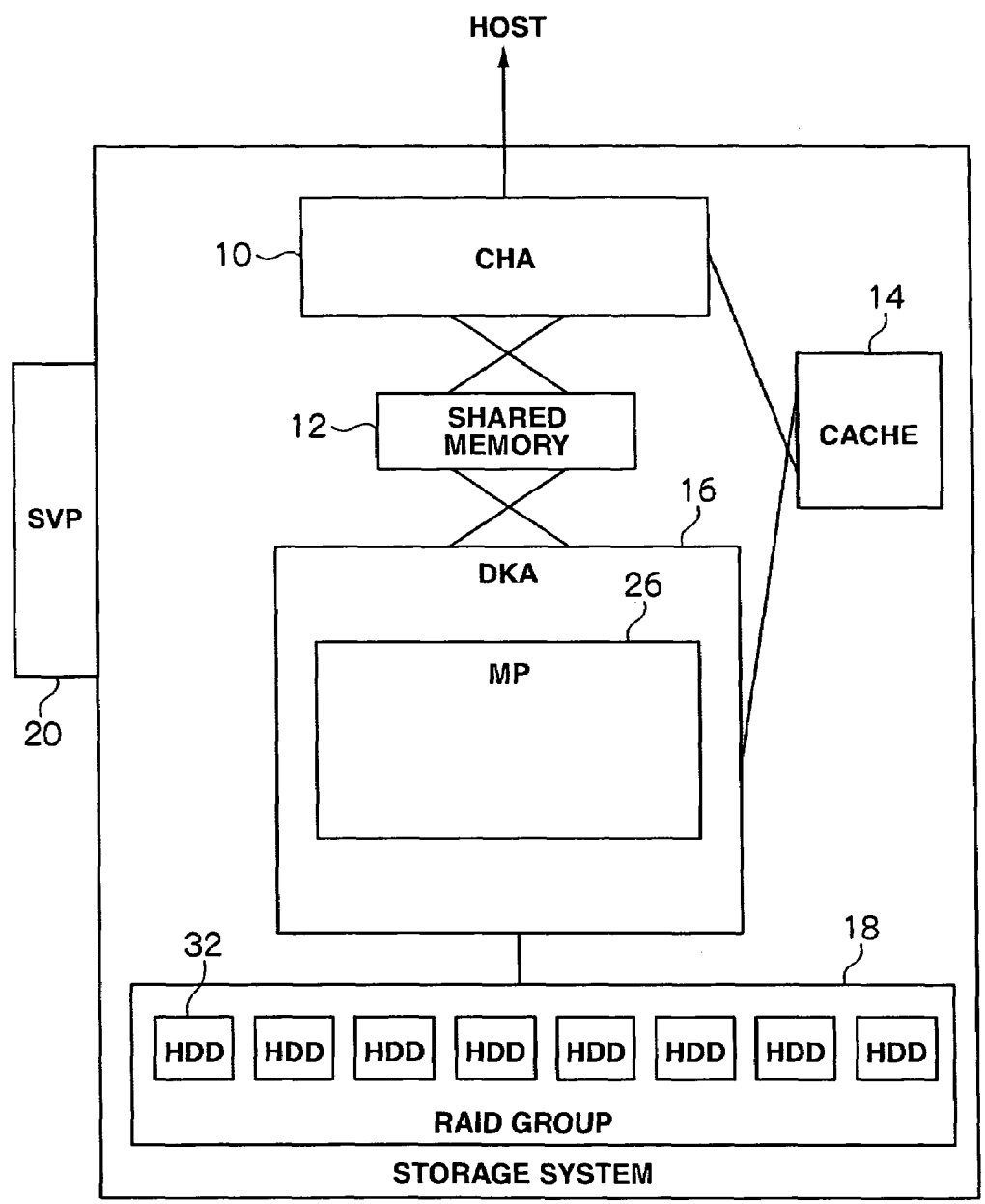
FIG. 1 is a block view of a configuration for a storage system showing a first embodiment of the present invention.
Figure 2:
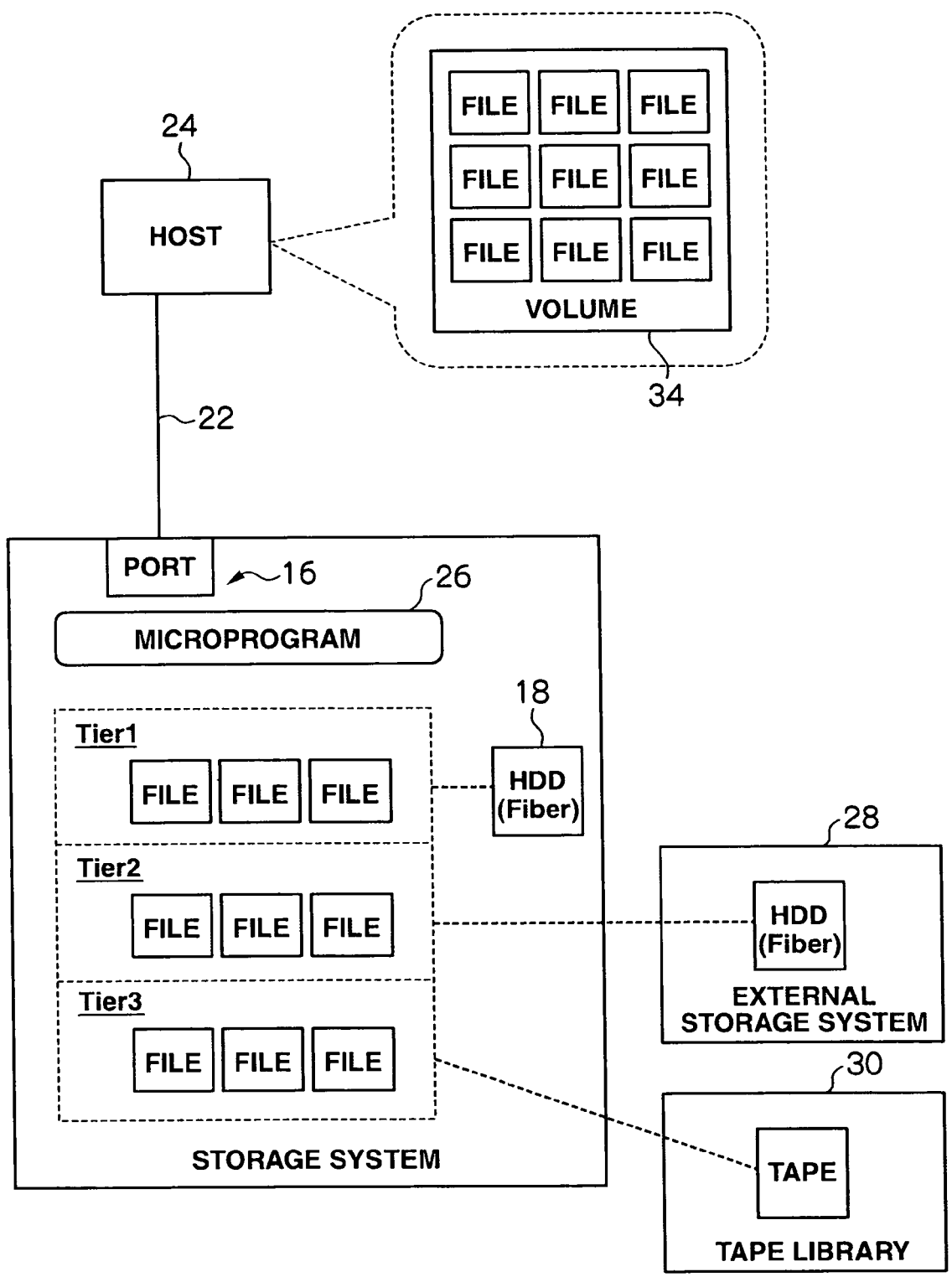
FIG. 2 is a view illustrating a method for allocating files to storage systems and hosts.

The following is a description of an embodiment of the present invention based on the drawings. FIG. 1 is a block view of a configuration for a storage system showing a first embodiment of the present invention, and FIG. 2 is a configuration view illustrating a tier structure for files for storage. In FIG. 1 and FIG. 2, a storage system is comprised of a channel adapter (CHA) 10, shared memory 12, cache memory 14, disc adapter (DKA) 16, and internal disc (Fiber) taken as storage apparatus, with a service processor (SVP) 20 being connected to the disc apparatus. The channel adapter 10 is connected to a host (upper order computer) 24, is connected to the disc adapter 16 via the shared memory 12, and is connected to the disc adapter 16 via the cache memory 14. The disc adapter 16 is equipped with a management processor (not shown) for carrying out various arithmetic processing in accordance with a microprogram (MP) 26. The management processor is connected to an internal disc 18 and is connected to an external disc 28 of an external storage system and a tape 30 of a tape library. Namely, the externally connected disc 28 and the tape 30 are capable of being connected to the management processor as a single element of storage. The internal disc 18 is equipped with a plurality of hard disc drives (HDD) 32, so as to constitute a RAID group.

When the internal disc 18, externally connected disc 28, and tape 30 are taken as storage, the storage region of the storage is put logically into the form of tiers, so as to give, for example, three tiers of uppermost Tier 1, intermediate Tier 2, and lowermost Tier 3, with relocation taking place in such a manner that files F11 to F33 are distributed at each tier. In this case, the files F11, F12 and F13 are set as the files for the internal disc 18, the files F21, F22 and F23 are set as files for externally connected disc 28, and the files F31, F32 and F33 are set as files for the tape 30. F11 to F33 are capable of being processed as a single volume 34 with respect to the host 24.

Figure 3:
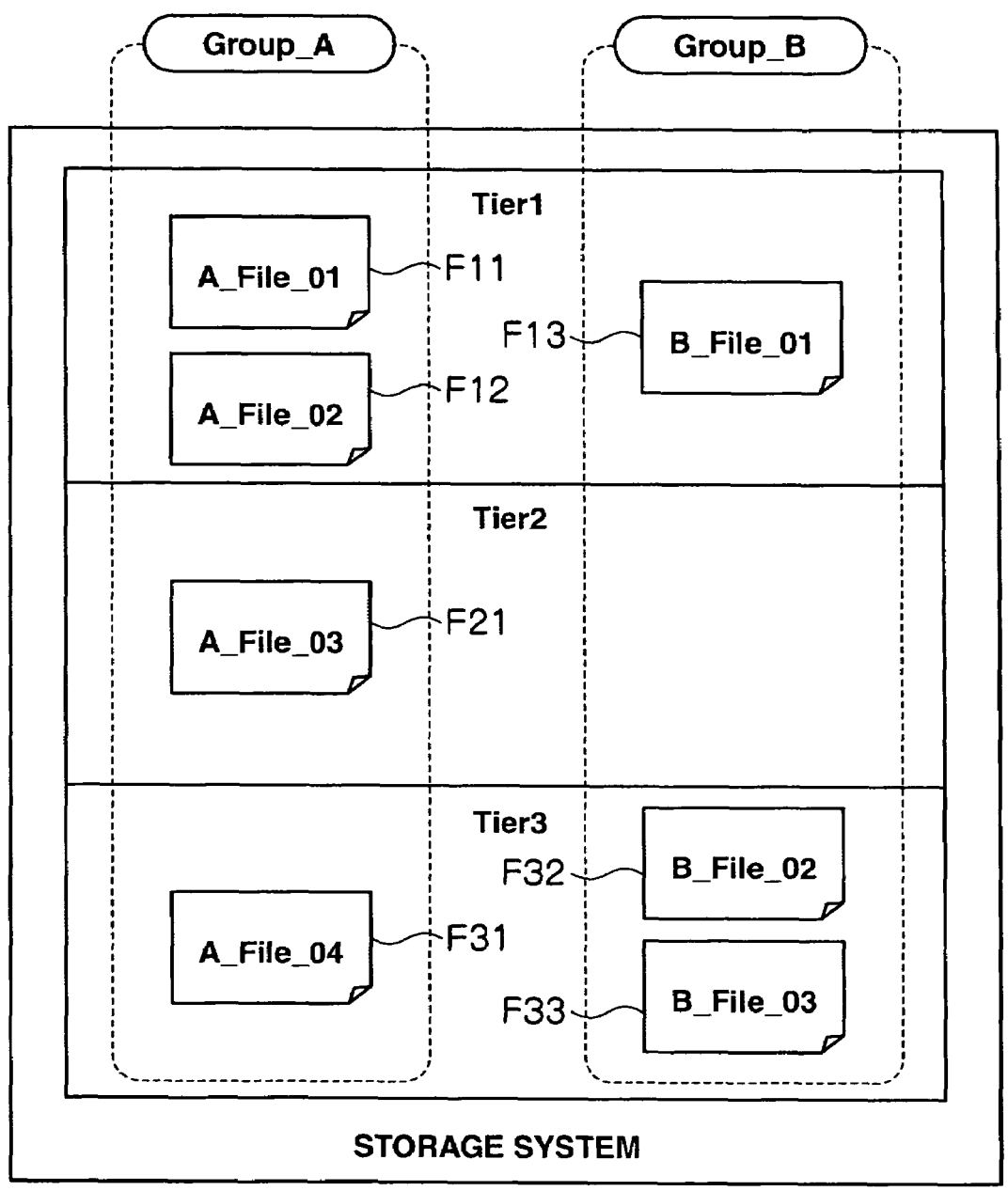
FIG. 3 is a view illustrating a tier structure for when files within a storage system are put into tiers.

Further, files F11 to F33 are classified into file groups every unit such as application units or service units as collections of files belonging to whichever tier. For example, as shown in FIG. 3, file F11 is relocated as A file 01, file F12 as A file 02, file F21 as A file 03, file 31 as A file 04, as files belonging to file group A, and file F13 is relocated as B file 01, file 32 as B file 02, and file F33 as B file 03, as files belonging to file group B.

As shown in FIG. 4, the management processor for managing the relocation of these files manages the relocation of each file based on a file group management table T1, key file management table T2, and tier management table T3. At this time, in the event that the management processor is taken to be a management server and the host 24 is taken to be an agent, as shown in FIG. 4(*d*), when files on a file group management table T4 are taken as the target of observation and an action takes place for a file described in a string of this file name, the management processor taken as the management server is notified of this information.

Information relating to a file group name 34, weighting 36, file name 38, key file 40, located tier 42, capacity 44, and file demotion conditions 46 is stored in the file group management table T1, and information relating to a file group name 48, key file conditions 50, promotion conditions 52, demotion conditions 54, and key file name 56 is stored in the key file management table T2. Information relating to a tier name 58, total tier capacity 60, and used tier capacity 62 is stored in the tier management table T3. Further, information relating to a file group name 64, file name 66, key file 68, located tier 70, and file demotion conditions 72 is stored in the file group management table T4.

The management processor built into the disc adapter 16 is equipped with a setting section for setting files belonging to each of the file groups A and B belonging to the uppermost Tier 1 as files to be observed (key files), a promotion condition determination section for determining whether or not promotion conditions are satisfied when a specific action from the host 24 occurs for files to be observed, a promotion section for promoting files belonging to the same file group as files to be observed that an action is received for when the promotion condition determination section determines that promotion conditions are satisfied, a demotion condition determination section for determining whether or not an item satisfying demotion conditions is present within files that are the subject of demotion based on time relating to processing of files that are the target of demotion of attribute information for files that are the target of demotion other than files subject to observation, and a demotion section for demoting files satisfying the demotion conditions to the lowest storage tier even for the tier at the current time when the demotion condition determining section determines that demotion conditions are satisfied.

Figure 5:
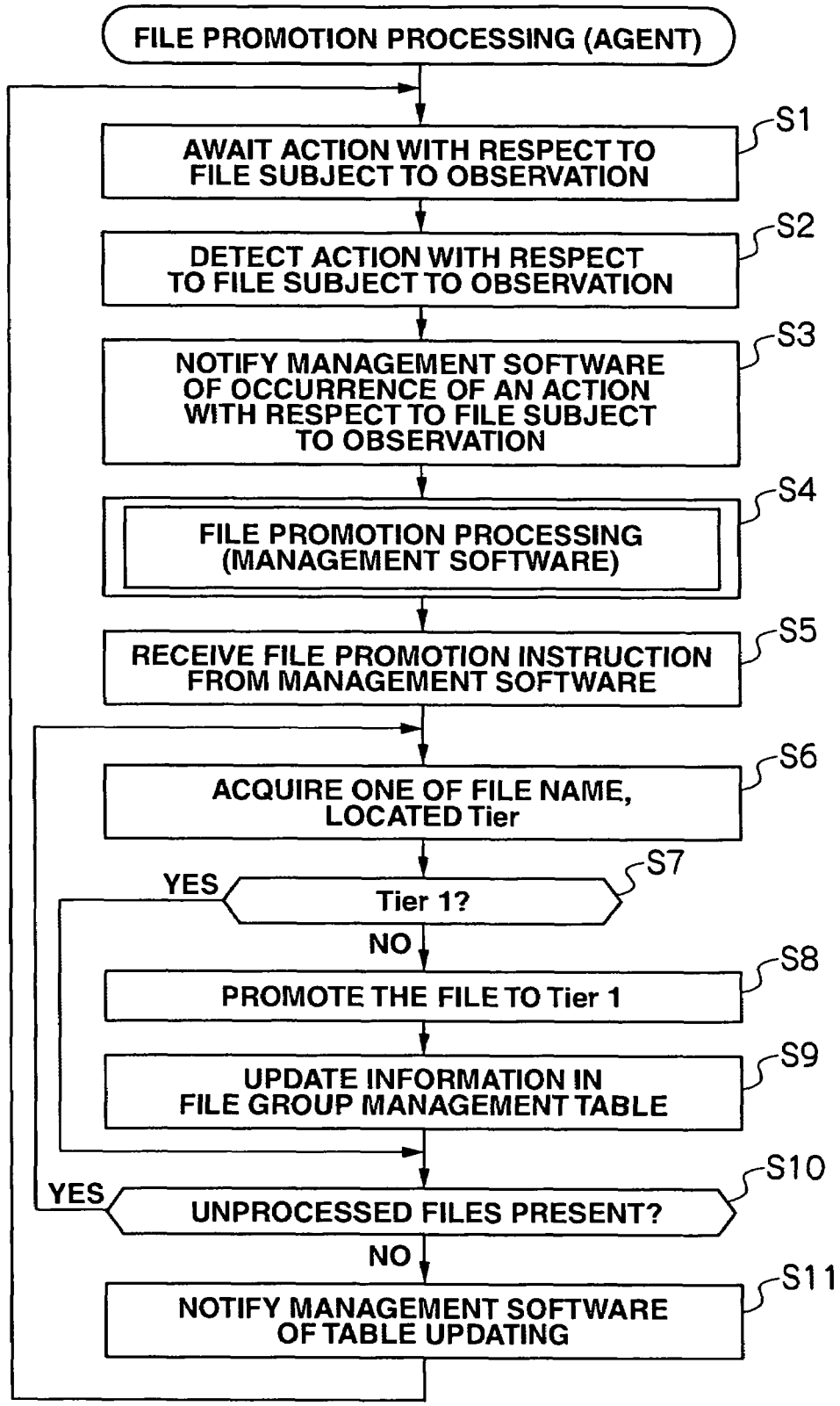
FIG. 5 is a flowchart illustrating file promotion processing for an agent.

Next, a description is given in accordance with a flowchart of FIG. 5 of processing when the host 24 is taken as an agent, the management processor of the disc adapter 16 is taken as a management server, an action satisfying the promotion conditions for the key file is generated, and files of the file group containing this key file are promoted to an uppermost tier. First, the host 24 awaits an action with respect to a file (key file) that is subject to observation (S1). When an action for a file that is subject to observation is detected (S2), the management server is notified of the generation of an action for a file that is subject to observation (S3). For example, when A file 01 is set as a key file, when an action such as newly producing, updating, referring or copying occurs as a specific action for the A file 01, the host 24 notifies the management server of the content of this action.

The management server then executes file promotion processing in accordance with the management software. The management software then carries out processing such as deciding tiers for moving files to, deciding a key file, receiving messages from the host 24, issuing tier moving instructions for files to the host 24, and issuing key file changing instructions to the host 24 based on the file group management table T1, the key file management table T2, and the tier management table T3.

Specifically, when a file promotion instruction is received from the management software (S5), the management server acquires one file name 66 and located tier 70 from the file group management table T4, and determines whether or not the acquired file is present in Tier 1 (S7). For example, as A file 03 and A file 04 of the files belonging to file group A are in Tier 2 and Tier 3, respectively, these files are promoted to Tier 1 (S8). After this, the management server updates information of the file group management table T4 to the effect that the files belonging to file group A are all in Tier 1 (S9). Next, the management server determines whether or not an unprocessed file is present (S10). When an unprocessed file is present, the processing of step S6 is returned to, and when processing of all of the files is complete, the update software is notified of table updating (S11), the processing of this routine is complete.

Figure 6:
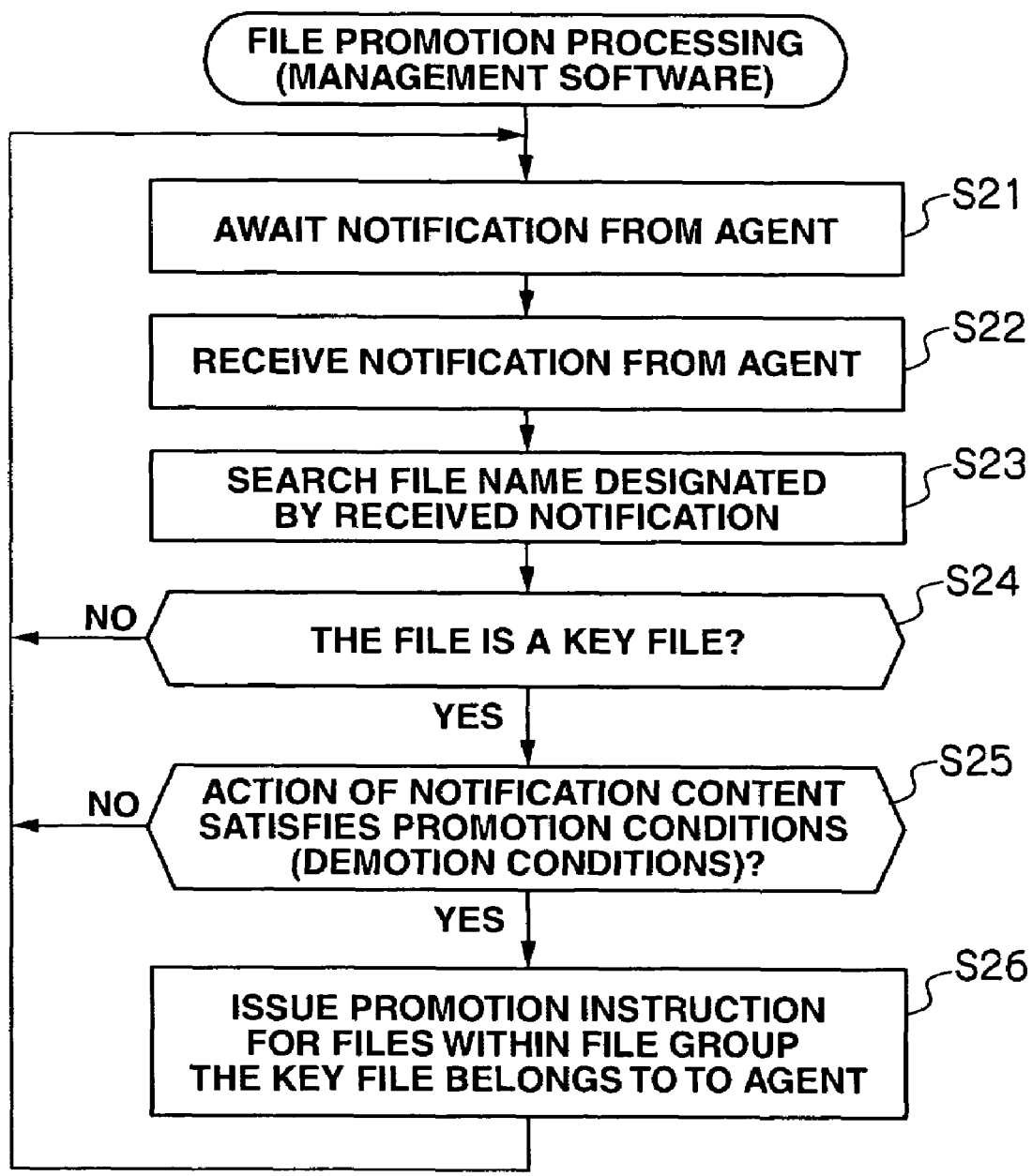
FIG. 6 is a flowchart illustrating file promotion processing for management software.
Figure 7:
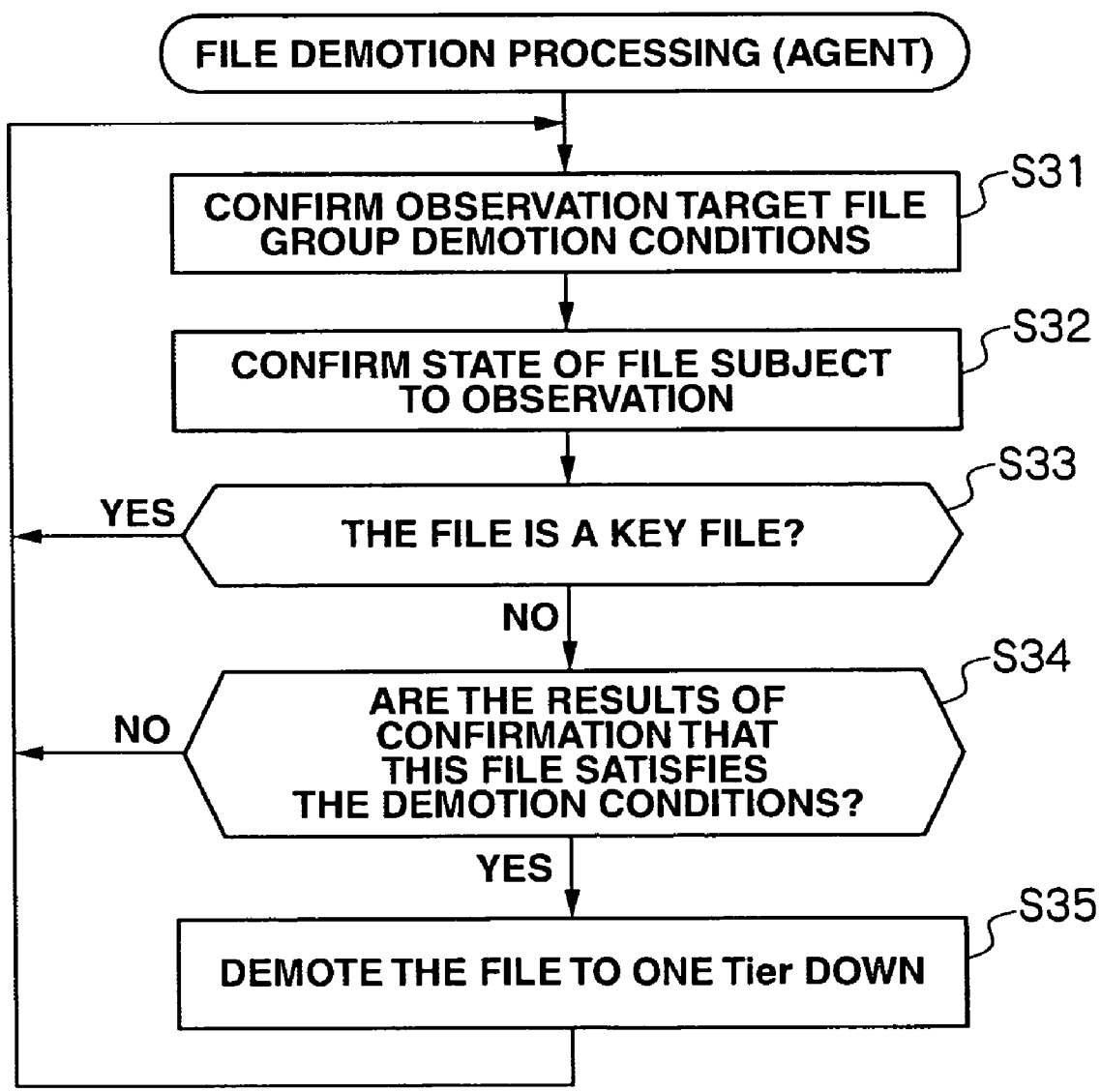
FIG. 7 is a flowchart illustrating file demotion processing for an agent.

On the other hand, in file promotion processing of step S4, as shown in FIG. 6, the management server awaits notification from the host 24 that is the agent (S21). When notification is received from the host 24 (S22), the management server searches for a file name indicating notification of receipt in accordance with file group management table T1 (S23). For example, when an action is generated for A file 01, the management server searches the file group management table T1 and determines whether or not A file 01 belonging to file group A is a key file (S24). At this time, the management server searches the file group management table T1, and when A file 01 is determined to be a key file, the key file management group T2 is searched, and it is determined whether or not an action of the notified content satisfies the content of the promotion conditions 52 (S25). Next, when the action of the notified content satisfies the promotion conditions, the management server issues an instruction to promote all of the files within the file group A that the key file (A file 01) belongs to is issued to the host 24 (S26), and the processing of this routine is complete.

In this way, according to this embodiment, it is possible to relocate all of the files belonging to file group A from the time of starting utilization to Tier 1 by setting A file 01 used first of the files belonging to the file group A as the key file.

Next, a description is given of processing at the time of demotion to a lower tier than the tier of the current time when the host 24 is taken to be an agent, the management processor of the disc adapter 16 is taken to be a management server, and a file of the file group satisfies the demotion conditions. This processing is executed at fixed time periods by the host 24, and the host 24 then searches the file group management table T4 for the demotion conditions for the file group subject to observation and confirms these conditions (S31). After this, the host 24 searches the file group management table T1 for the conditions for the file subject to observation (key file), and confirms these conditions (S32). Next, the host 24 determines whether or not the file is a key file (S33). For example, the host 24 searches the file group management table T1 and determines whether or not A file 03 of the files belonging to the file group A is a key file. When it is determined that A file 03 is not a key file, it is determined whether or not A file 03 satisfies the demotion conditions (S34). When it is determined that A file 03 satisfies the demotion conditions, the host 24 demotes A file 03 that is the file to a tier that is one level lower (S35). Namely, the host 24 demotes A file 03 from Tier 2 to Tier 3, and the processing of this routine is complete.

Here, processing when the file satisfies the demotion conditions is executed at a time where time x weighting coefficient exceeds a threshold value. For example, the time from the time of day of the final update, the time from the time of day of the final reference, the time from the time of day of final promotion to the uppermost tier, or the time from the time of day of final demotion to the lowermost tier can be used as the time in this case, and the weighting of the file group designated by the user, the file size, date of production, or WORM attribute may be used as the weighting coefficient.

When the value of the weighting is made small, the weighting of the file group becomes high, the weighting coefficient becomes small to the extent that the value of the weighting is small, and it becomes difficult to exceed the threshold value. Namely, it is more difficult for files of file groups of a higher importance to be demoted to a lower tier. Further, the threshold value is more easily exceeded for a larger file size. Namely, demotion to a lower tier is easier for a larger size. As a result, it is possible to reduce capacity used at the uppermost tier. Further, demotion to a lower order tier also occurs more easily when the data of production of the weighting coefficient is older. Values are designated, for example, every Read/Write/Execute as a WORM attribute and are combined and calculated. For example, Read is taken as 1, Write as 2, and Execute as 3, and when a coefficient taking the sum of these as a denominator is used, the ease of demotion becomes Read only>Read Write>Read Write Execute.

Figure 8:
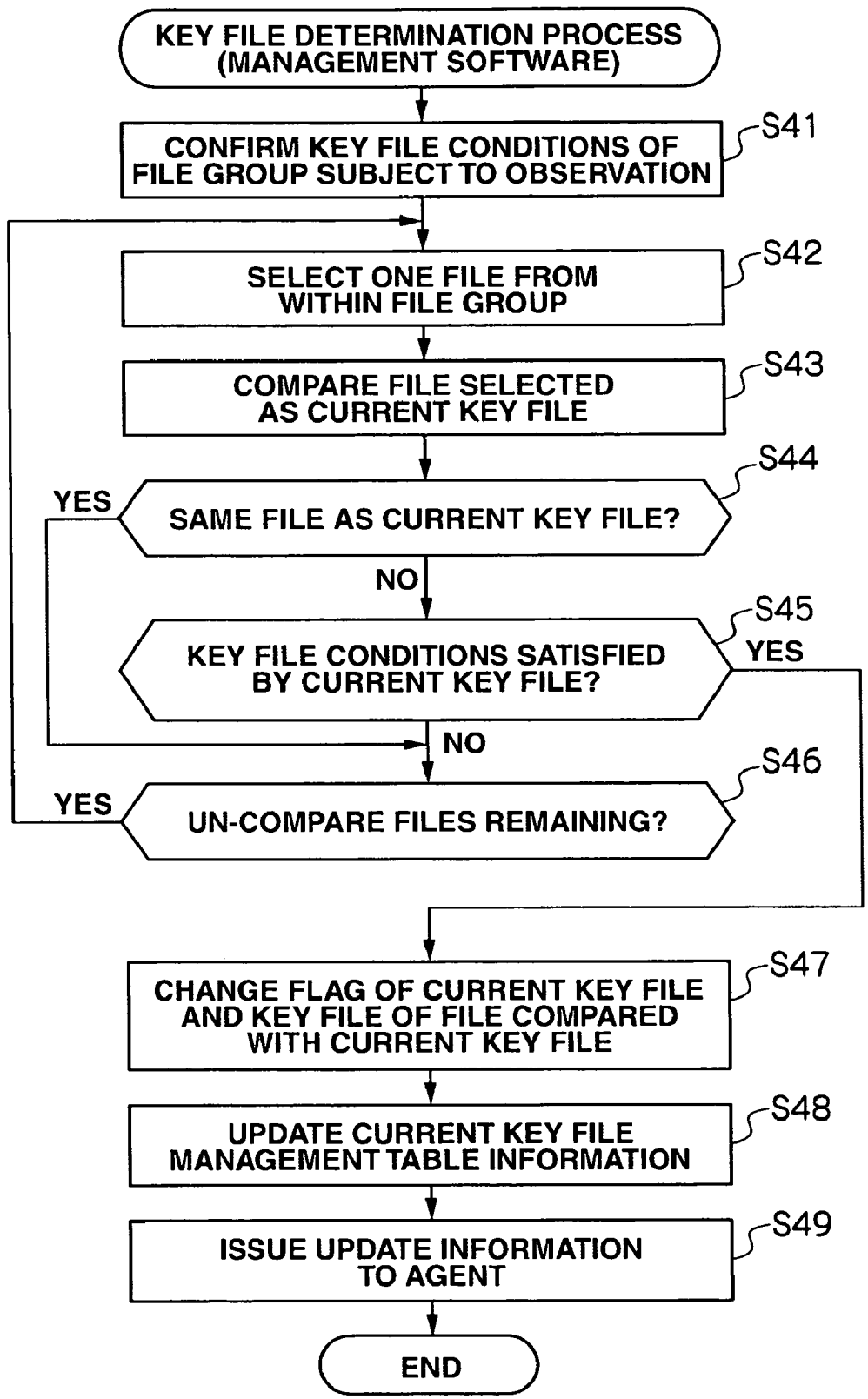
FIG. 8 is a flowchart illustrating key file deciding processing for management software.

Next, a description is given of key file determination processing in accordance with the flowchart of FIG. 8. The determination of this key file may be executed in a manner triggered by a specific action with respect to the file group such as observation in fixed time periods or adding a new file, etc. Specifically, the management processor of the disc adapter 16 searches the key file conditions 50 of the key file management table T2 and the key file name 56, confirms the key file conditions of the file group subject to observation (S41), searches the file group management table T4, and selects one file from within the file group (S42). For example, the management processor selects, for example, A file 03 as the file within file group A based on the file name 66 of file group management table T4, key file 68, and located tier 70, compares A file 01 that is the key file for the current time and A file 03 that is the selected file (S43), and determines whether or not the selected file is the same as the key file of the current point (S43). When the selected file A file 03 is different to A file 01 that is the key file at the current time, it is determined whether or not the selected A file 03 satisfies the key file conditions to a greater extent than A file 01 that is the key file (S45). When this is not satisfied, a determination is made as to whether or not files that have not yet been compared remain (S46), and the processing of step S42 is returned to. On the other hand, when it is determined that the conditions are satisfied, the management processor changes key file flags for the A file 01 that is the key file for the current time and the key file flag for the A file 03 that is the selected file (S47). Namely, the management processor changes A file 01 to "False" with respect to the key file 68 of the file group management table T4, and changes the key file 68 for the A file 03 to "True". Next, the management processor updates the key file name 56 corresponding to a key file condition A1 of the key file conditions 50 of key file management table T2 to "A file 03", update information is issued for the host 24 (S49), and the processing of this routine is complete.

In this way, it is possible to dynamically change key files by designating conditions for the key files, and it is possible to constantly maintain optimization of promotion/demotion conditions for files belonging to file groups represented by a key file.

While a file is promoted, as shown in FIG. 9(a), for example, a moving method may be adopted where, at the time of file promotion of file F21 belonging to Tier 2, file F21 on Tier 2 is deleted, and file F21 is moved to Tier 1 as file F11, or as shown in FIG. 9(b), a copying method may be adopted where file F21 existing on Tier 2 is copied to Tier 1 at the time of file promotion as file F11 while file F21' that is the actual file itself remains on Tier 2.

Figure 10A:
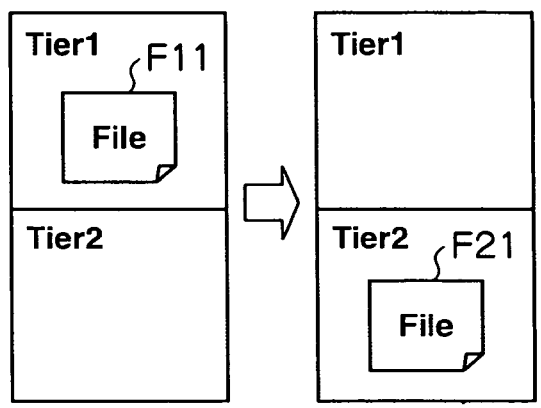
FIG. 10A, FIG. 10B and FIG. 10C each shows a view illustrating a demotion pattern for a file.
Figure 10B:
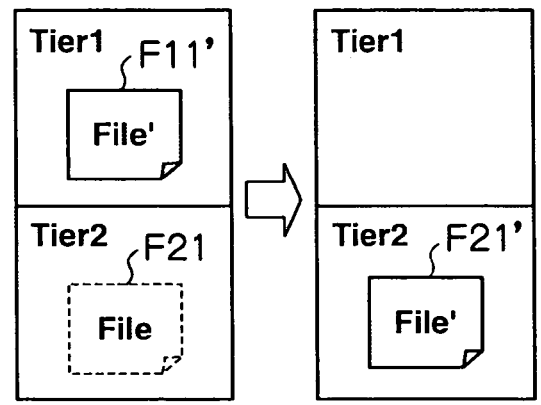
Figure 10C:
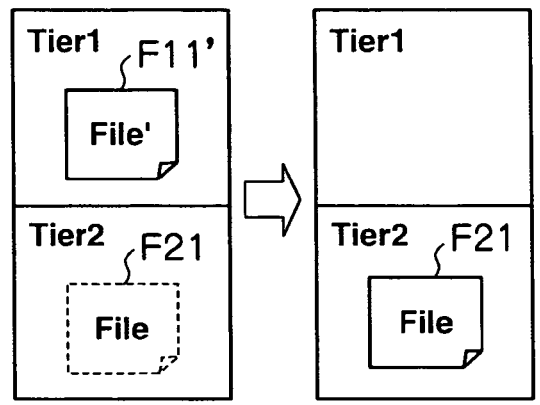

On the other hand, while a file is demoted, as shown in FIG. 10(a), a moving method may be adopted where file F11 present at Tier 1 is moved to Tier 2 as file F21 at the time of file demotion and file F11 of Tier 1 is deleted, or as shown in FIG. 10(b), an updating method may be adopted where file F11' present at Tier 1 is changed as file F21 of Tier 2, and the file F21 after changing is updated as the actual file F21' at Tier 2. Further, as shown in FIG. 10(c), it is also possible to adopt a deletion method for demotion corresponding to the copying method for the time of file promotion. In this event, file F11' present at Tier 1 is demoted as actual file F21 of Tier 2 after changing as file F21 of Tier 2. In this event, file F21 is deleted after changing, and only the actual file F21 on Tier 2 is taken to be a file that is the target of processing.

Figure 11:
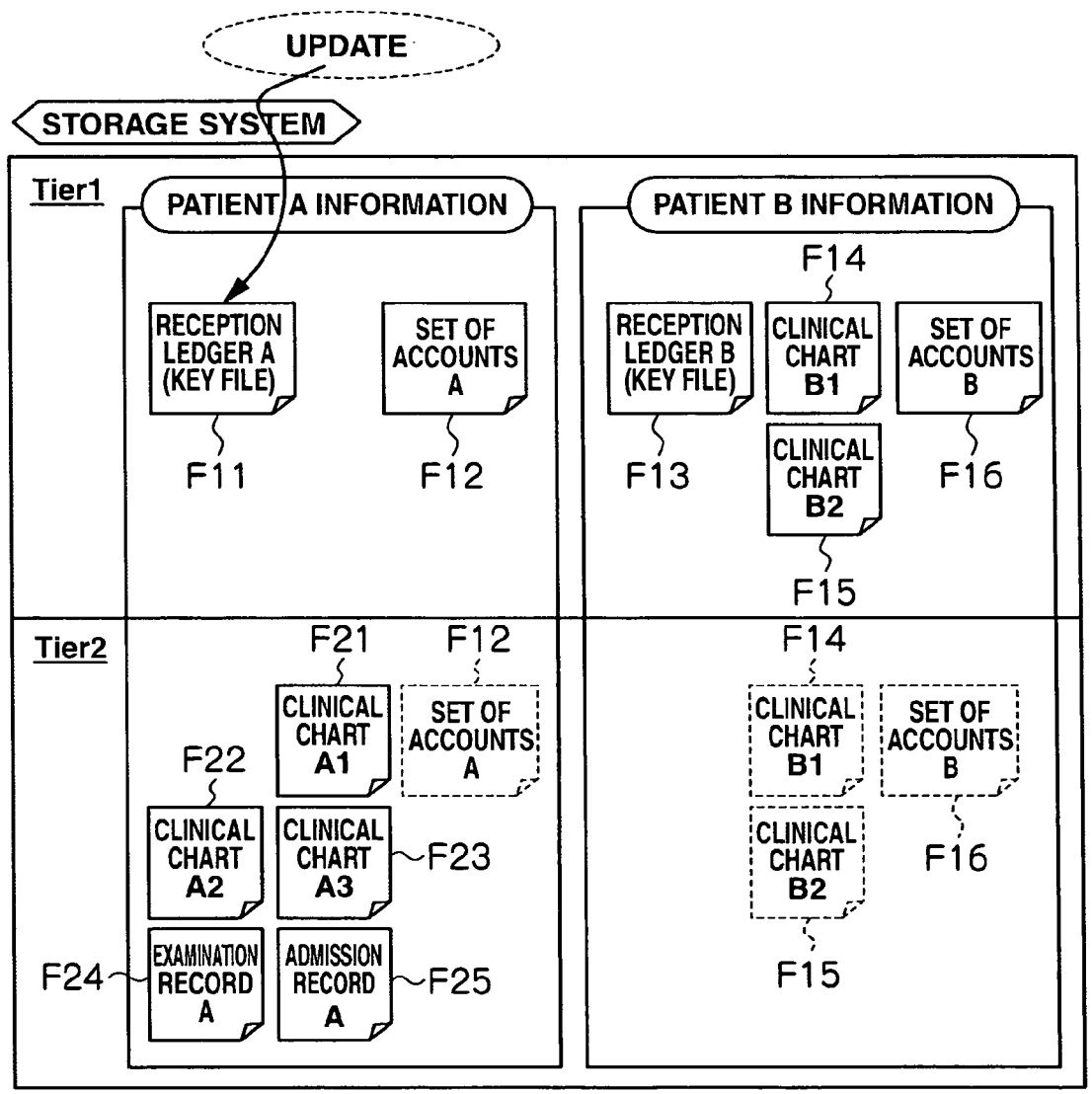
FIG. 11 is a structural view illustrating a tier structure for files when the present invention is applied to a patient management system in a hospital.

Next, a description is given of an embodiment where the present invention is applied to a patient management system for a hospital based on FIG. 11. The storage system of this embodiment divides a file group into file group A for managing patient A information and a file group B for managing patient B information, with information belonging to each of file group A and file group B being stored divided between two tiers of Tier 1 and Tier 2.

For example, a reception ledger A file F11 that is a key file and a set of accounts file F12 are relocated at Tier 1 of the files belonging to file group A, and a clinical chart A1 file F21, clinical chart A2 file F22, clinical chart A3 file F23, examination record A file F24 and admission record A file F25 are relocated at Tier 2. a reception ledger B file F13 that is a key file, clinical chart B1 file F14, clinical chart B2 file F15, and set of accounts B file F16 are relocated at Tier 1 of files belonging to file group B.

A configuration for the file group management table T1 used by the management server at this time is shown in FIG. 12(a), a configuration for the key file management table T2 is shown in FIG. 12(b), a configuration for the Tier management table T3 is shown in FIG. 12(c), and a configuration for the file group management table T4 at the host is shown in FIG. 12(d). Information relating to a file group name 34, weighting 36, file name 38, key file 40, located tier 42, capacity 44, and file demotion conditions 46 is stored in the file group management table T1, and information relating to a file group name 48, key file conditions 50, promotion conditions 52, demotion conditions 54, and key file name 56 is stored in the key file management table T2. Information relating to a tier name 58, total tier capacity 60, and used tier capacity 62 is stored in the tier management table T3. Further, information relating to a file group name 64, file name 66, key file 68, located tier 70, and file demotion conditions 72 is stored in the file group management table T4. In this case, patient A information and patient B information is described at file group names 34, 48 and 64, the reception ledger A, clinical chart A1, clinical chart A2, clinical chart A3, examination record A, admission record A, and set of accounts A are described at the file name 38 corresponding to patient A information for file group names 34 and 64, and the reception ledger B, clinical chart B1, clinical chart B2, and set of accounts B are described in file names 38 and 66 corresponding to the patient information B for file group names 34 and 64.

Here, when an update action occurs with respect to reception ledger A file F11 that is a key file, the host 24 that is an agent notifies the management server (management processor) that an update action has occurred at the reception ledger A file F11. The management server then confirms that an update action satisfying the promotion conditions has occurred at the key file belonging to the file group A. The management server then confirms the capacity of Tier 1 using the Tier management table T3 (the used capacity of Tier 1 is 49 GB with regards to the total capacity of Tier 1 of 50 GB) and it is determined that all of files F21, F22, F23 and F24 present in Tier 2 cannot be promoted to Tier 1 with the current situation remaining as is. In order to ensure the capacity of Tier 1, the management server determines the demotion of files for patient B information of a light (low) weighting to Tier 2 from patient A information, and determines the promotion of all of the files F21, F22, F23, F24 and F25 to Tier 1, and issues an instruction to demote files for patient B information to the host 24.

The host 24 demotes the clinical chart B1 file F14, clinical trial B2 file F15, and set of accounts B file F16 to Tier 2 as files for patient B information. At this time, host 24 assigns WORM attributes to the clinical chart B1 file F14 and the clinical trial B2 file F15. The clinical chart B1 file F14 and clinical chart B2 file F15 are then demoted to Tier 2 using the deletion method, and the set of accounts B file F16 is demoted to Tier 2 using the updating method. The host 24 then notifies the management server of this when all of the files for patient B information are demoted to Tier 2. The management server receiving this notification then issues an instruction to promote files of the patient A information to Tier 1 to the host 24. The host 24 executes processing to promote all of the files F21, F22, F23, F24 and F25 present in Tier 2 of the files belonging to the file group A to Tier 1 using the copying method. When moving of all of the files is complete, the host 24 notifies the management server that promotion of all of the files is complete, and file promotion processing is carried out.

Figure 13:
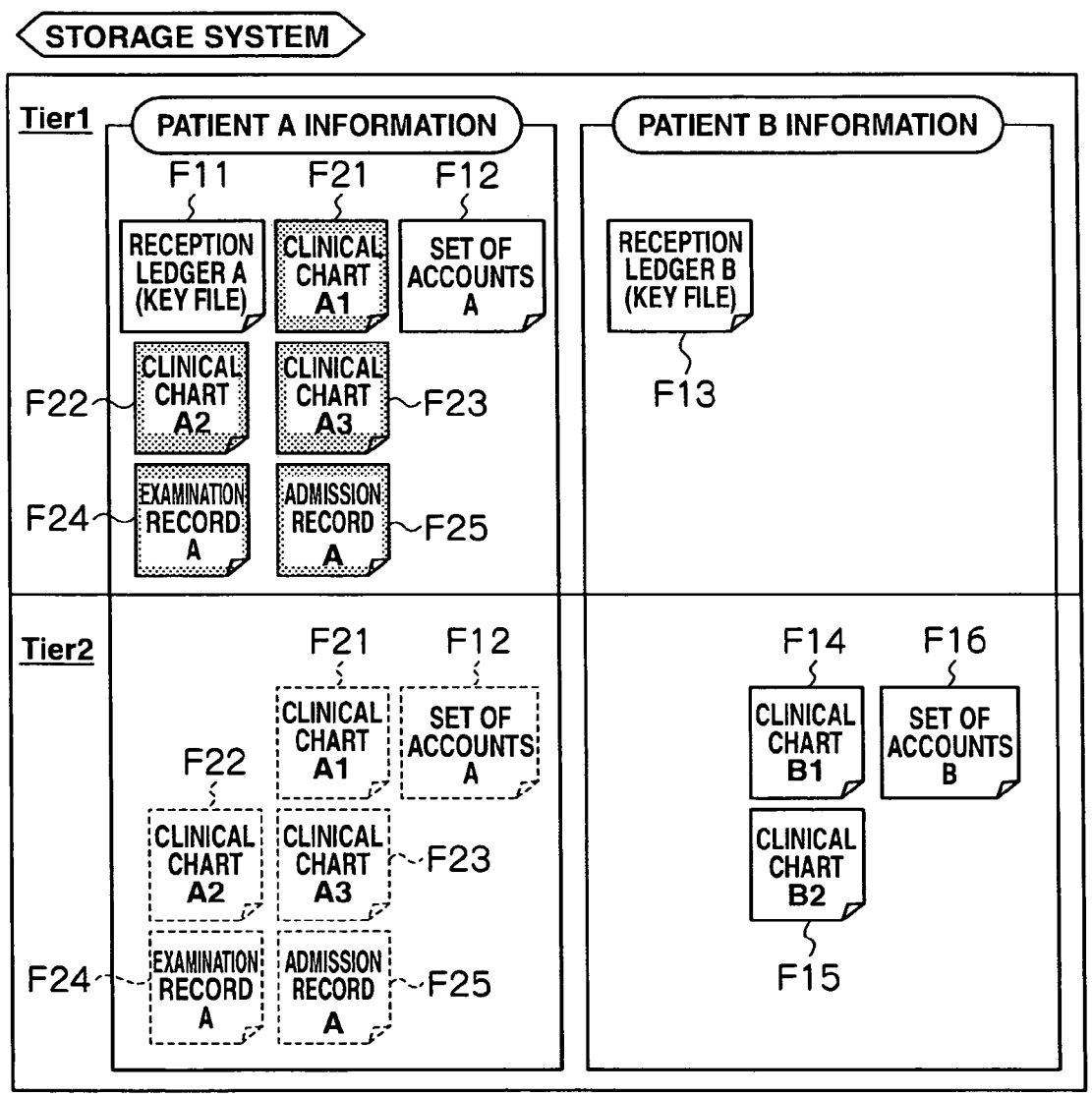
FIG. 13 is a configuration view illustrating a tier structure for files when file promotion processing is implemented in a patient management system.

The state of the files of the storage system when file promotion processing finishes is shown in FIG. 13. The clinical chart B1 file F14, clinical chart B2 file F15, and set of accounts B file F16 are demoted to Tier 2, in place of which clinical chart A1 file F21, clinical chart A2 file F22, clinical chart A3 file F23, examination record A file F24 and admission record A file F25 are promoted to Tier 1. At this time, the column "Tier 2" of the clinical chart A1, clinical chart A2, clinical chart A3, examination record A, and admission record A of located Tier 42 of the file group management table T1 is changed to "Tier 1", and the column "Tier 2" of the clinical chart A1, clinical chart A2, clinical chart A3, examination record A, and admission record A of located Tier 70 of file group management table T4 for host use is changed to "Tier 1".

According to this embodiment, when an action relating to patient A occurs, it is possible for all of the files relating to patient A to be relocated to Tier 1, and the information relating to patient A can therefore be rapidly extracted from Tier 1 and utilized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A file management method of a storage system storing a plurality of files into a plurality of storage tiers based upon data importance and utilization frequencies, comprising:
   a step of managing a plurality of file groups each of which is related to an application used by a host unit and contains at least two of the files stored in different one of the tiers;
   a step of setting, for each of the file groups, at least one file belonging to said each file group and being stored in the uppermost one of the tiers as a file subject observation;
   a step of determining whether or not promotion conditions are satisfied when a specific action occurs for said file subject to observation;
   a step of promoting the other files belonging to the same file group as said file subject to observation to the uppermost tier in response to the specific action so that all files belonging to said file group can be used from start of the utilization, when promotion conditions are satisfied;
   a step of demoting the other files belonging to the same file group as said file subject to observation to the lowermost tier, when demotion condition are satisfied,
   wherein said file subject to observation is determined dynamically by referring to a table storing a condition of file subject to observation, comparing the present file subject to observation and the other files of each said file group, and switching from the present file subject to observation to the most appropriate file of each said file group which satisfies the condition as a new file subject to observation;
   a step of determining whether or not files satisfying demotion conditions exist based on time and a weighting coefficient pertaining to processing of the file attribute information for the files which are other than files subject to observation of said each file group; and
   a step demoting a file satisfying the demotion conditions to a tier of a lower order than a current tier when the file is determined to satisfy the demotion conditions.

2. The file management method according to claim 1, wherein the promotion conditions determining step involves determining whether or not there is a margin in capacity of the uppermost tier when the specific action occurs as an element of the promotion conditions.

3. The file management method of claim 1, wherein the specific action is one of newly producing, updating, referring and copying.

4. The file management method of claim 1, further comprising a step of determining whether or not the other files other the file subject to observation of said each file group exist that satisfy demotion conditions; and a step of demoting a file satisfying the demotion conditions to a tier of a lower order than a current tier when the file is determined to satisfy the demotion conditions.

5. The file management method of claim 1, further comprising a step of determining whether or not files satisfying demotion conditions exist based on attribute information for the files which are other than files subject to observation of said each file group; and a step of demoting a file satisfying the demotion conditions to a tier of a lower order than a current tier when the file is determined to satisfy the demotion conditions.

6. The file management method according to claim 1, wherein the condition of the file subject to observation is related to a most recent update date or file identifying information.

7. A storage system comprising:
   a storage with storage regions logically put into a plurality of storage tiers which are stored with a plurality of files based upon data importance and utilization frequencies, wherein file groups are relocated so as to be distributed at each tier, and sets of files belonging to any tier are put into file groups; and
   a management processor which:
   manages a plurality of file groups each of which is related to an application used by a host unit and contains at least two of the files stored in different ones of the tiers,
   sets, for each of the file groups, at least one file belonging to said each file group and being stored in the uppermost one of the tiers as a file subject to observation,
   determines whether or not promotion conditions are satisfied when a specific action occurs for said file subject to observation, and
   promotes the other files belonging to the same file group as said file subject to observation to the uppermost tier in response to the specific action so that all files belonging to said file group can be used from start of utilization, when the promotion conditions are satisfied, and
   demotes the other files belonging to the same file group as said file subject to observation to the lowermost tier, when demotion condition are satisfied,
   wherein said file subject to observation is determined dynamically by referring to a table storing a condition of file subject to observation, comparing the present file subject to observation and the other files of each said file group, and switching from the present file subject to observation to the most appropriate file of each said file group which satisfies the condition as a new file subject to observation, and
   wherein the management processor determines whether or not files satisfying demotion conditions exist based on time and a weighting coefficient pertaining to processing of the file subject to demotion of attribute information for the files which are other than files subject to observation of said each file group, and demotes a file satisfying the demotion conditions to a tier of a lower order than a current tier when the file is determined to satisfy the demotion conditions.

8. The storage system according to claim 7, wherein the management processor determines whether or not there is a margin of safety for the uppermost tier at the time of generating the specific action as an element of the promotion conditions.

9. The storage system of claim 7, wherein the specific action is one of newly producing, updating, referring and copying.

10. The storage system according to claim 7, wherein the management processor
   determines whether or not the other files other than the file subject file to observation of said each file group exist that satisfy demotion conditions, and
   demotes a file satisfying the demotion conditions to a tier of a lower order than a current tier when the file is determined to satisfy the demotion conditions.

11. The storage system according to claim 7, wherein the management processor
   determines whether or not files satisfying demotion conditions exist bases on attribute information for the files which are other than files subject to observation of said each file group, and
   demotes a file satisfying the demotion conditions to a tier of a lower order than a current tier when the file is determined to satisfy the demotion conditions.

12. The storage system according to claim 7, wherein the condition of the file subject to observation is related to a most recent update date or file identifying information.

* * * * *